United States Patent [19]
Pontello

[11] 3,791,194
[45] Feb. 12, 1974

[54] TESTING OF FUEL FILTERS USING THERMOGRAPHY

[75] Inventor: Anthony P. Pontello, Springfield, Pa.

[73] Assignee: The United States of America as represented by the Secretary of the Navy, Washington, D.C.

[22] Filed: Sept. 25, 1972

[21] Appl. No.: 292,013

[52] U.S. Cl. .................................. 73/15 R, 73/37
[51] Int. Cl. .................... G01m 3/38, G01n 25/00
[58] Field of Search ...... 73/15, 37, 38, 40; 250/83.3

[56] References Cited
UNITED STATES PATENTS

| | | | |
|---|---|---|---|
| 3,293,431 | 12/1966 | Bennett et al. | 73/38 |
| 3,320,792 | 5/1967 | Peranio | 73/38 |
| 3,434,332 | 3/1969 | Maley | 73/15 |
| 3,566,669 | 3/1971 | Lawrence | 73/15 |

Primary Examiner—Herbert Goldstein
Attorney, Agent, or Firm—R. S. Sciascia; Henry Hansen; Arthur A. McGill

[57] ABSTRACT

A coalescer element that functions as a filter for aircraft fuels is connected by means of a bearing surface to a heated air supply. The coalescer element is slowly rotated and scanned by means of an infrared device for sensing temperature on the outer surface of the fuel filter. The infrared scanner supplies signals to a color or black and white video screen which displays thermograms of the surface of the fuel filters. Non-uniform high temperatures on the surface of the filter, indicative that the filter is faulty, on being scanned by the scanner are displayed as a light color or light shade on the thermogram indicating a flaw in the coalescer element.

9 Claims, 2 Drawing Figures

TESTING OF FUEL FILTERS USING THERMOGRAPHY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to the testing of filters for defects and more particularly to a non-destructive testing of all coalescer elements used for jet fuel filtering.

Coalescers are used prior to refueling aircraft, in fuel systems at air stations and aboard refueling trucks to remove harmful contaminants from jet fuels. These filters can also serve to reclaim previously contaminated fuel and prevent the fuel from being disposed of as waste material. Therefore, a critical need exists to develop a method for testing all coalescer elements to be used without destroying their effectiveness.

Limited performance of coalescer elements due to faulty material and/or construction can result in serious damage to fuel systems that can be both dangerous and costly. To eliminate this damage, a need exists for a high level of quality control by the manufacturers of the elements. Most present day methods of testing employed in the quality control of the elements are destructive. These tests comprise subjecting coalescer elements to liquids having solid and water contaminants. Due to the destructive nature of the test, only a limited number in a batch can be tested. Experience has shown that an appreciable number of elements from a batch which passed this test is often defective.

A non-destructive test of a coalescer element has previously been described by applicant in U. S. Pat. office application Ser. No. 175,238, now U.S. Pat. No. 3,736,790, patented June 5, 1973 in which a fluorescent light source is utilized in conjunction with a liquid crystal coating placed on the surface of the element to determine flaws.

While the above system works well in providing non-destructive testing, it requires coating the filter which tends to become more costly and time consuming than the present invention.

SUMMARY OF THE INVENTION

Accordingly, it is a general purpose and object of the present invention to provide an improved test for coalescer elements. It is a further object to provide an improved non-destructive test. Additional objects are to have the test more rapid and inexpensive and less complex than those tests heretofore known.

This is accomplished according to the present invention by providing a differential air pressure across the coalescer element with the higher pressure on the inside of the element and lower pressure on the outer surface. The outer surface is scanned by infrared detectors. Signals transmitted from the detectors form a thermogram of the element on a color or black and white video screen with differences in color or shading on the thermogram depicting differences in temperatures on the souter surface of the element. The differences in temperature are the result of flaws in the coalescer element creating a change in temperature of the air passing through.

DESCRIPTION OF THE PREFERRED EMBODIMENT

Figures 1, 2:
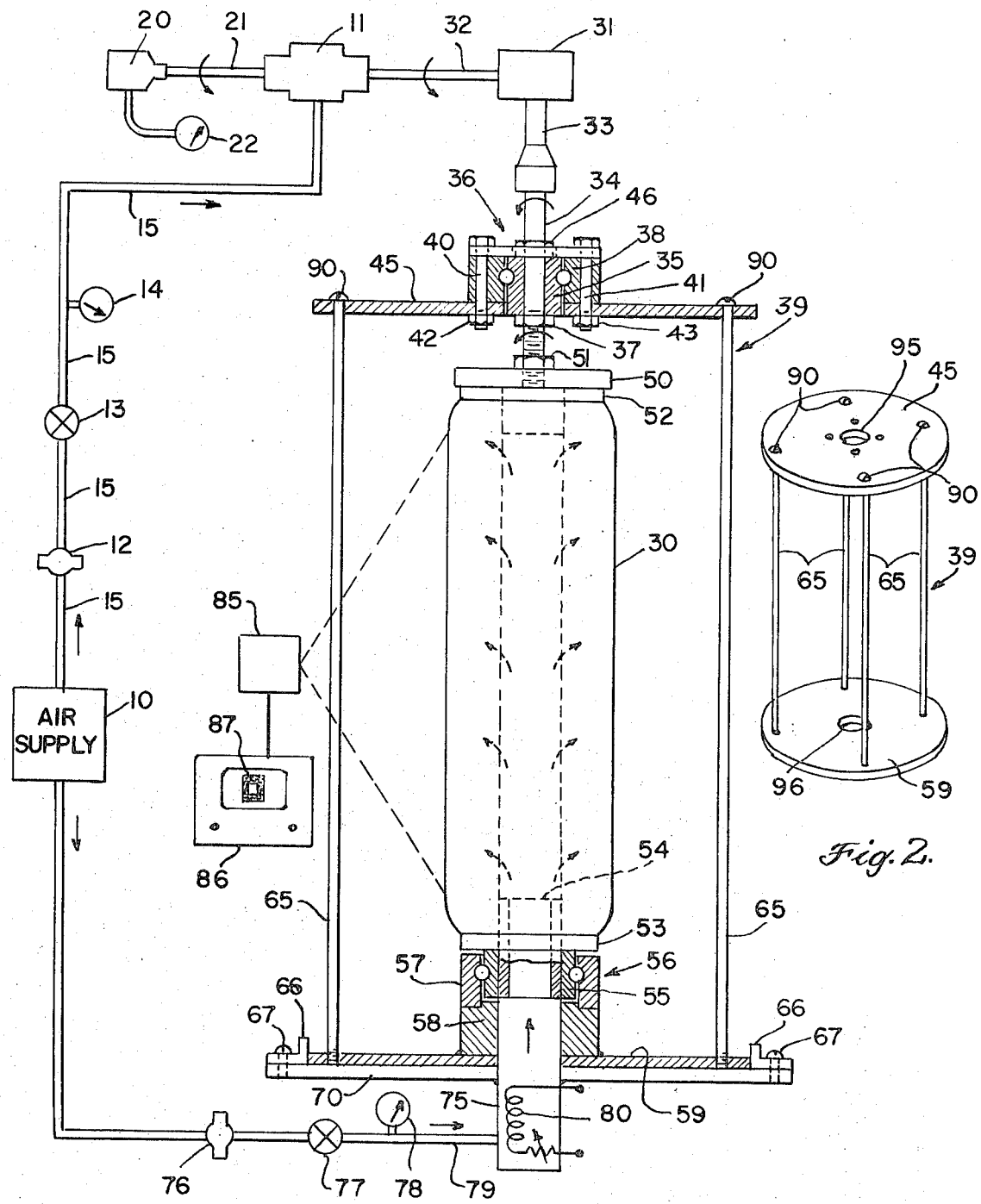
FIG. 1 is a diagrammatic arrangement of a test structure, partially in cross section of the present invention.
FIG. 2 is a view of the housing shown in FIG. 1.

Thermography involves the use of equipment for detecting temperature differences on an object in the form of a thermal picture called a thermogram. The thermogram is formed utilizing natural infrared radiation signals which vary with the surface temperature of the object. The colors or shading displayed in a thermogram show various temperature changes with the lighter colors or shades, if the picture is displayed in black and white, representing the higher temperatures. Thermograms formed by high frequency infrared scanning produce a real-time picture on a monitor screen in either color or black and white.

Referring now to the drawing and more particularly to FIG. 1, there is shown a pressurized air supply 10, that may be cylinders of pressurized air, a supply available in a building, or any other suitable means. The air supply is connected to an air motor 11 through air pressure regulator 12, shut off valve 13, and pressure gage 14 by means of suitable piping 15. The regulator 12 is adjusted to supply a predetermined air pressure for air motor 11 whose speed is a function of the air pressure supplied.

Air motor 11 is connected to tachometer generator 20 through connecting rod 21. The tachometer generator 20 provides a signal for read-out of the speed air motor 11 on rpm gage 22. The primary function of motor 11 is to rotate coalescer element 30. This is accomplished by mechanically connecting the motor 11 output to gear box 31 through rod 32. The gear box 31 provides angular displacement of the driving force and, in addition, may provide a reduction ratio of rpm as required. A linkage 33 connected to gear box 31 provides a drive to rod 34 that passes through and engages the inner rotating element 35 of bearing 36. Lock nuts 46 and 37 secure rod 34 to element 35. The outer stationary element 38 of bearing 36 is secured to an upper plate 45 of housing 39 by means of bolts 40 and 41 having respective nuts 42 and 43. Rod 34 is threaded to a T-shaped coalescer cap 50 with a nut 51 compressing the top of cap 50. An upper annular end cap 52 and coalescer element 30 provide a press fit for cap 50.

A lower annular end cap 53 of coalescer element 30 has a hollow cylindrical bearing insert 54 press fitted to both the annular opening in the end cap 53 and the coalescer element 30. The bearing insert 54 is also press fitted to the inner rotating element 55 of bearing 56. The inner element 55 is raised slightly above outer stationary element 57 on bearing 56 so that element 55 may rotate in unison with coalescer element 30, end cap 53 and insert 54.

Outer stationary element 57 of bearing 56 has an inner annular surface connecting to an annular ridge of lower bearing base support 58. This connection may be a press fit or element 57 can be welded or affixed in any other manner to base support 58 so that the two are stationary with respect to each other. Support 58 is then welded or otherwise affixed to lower plate 59. Strips 65 connect upper and lower plates 45 and 59 of housing 39. Clamps 66 having screws 67 locate housing 39 on base member 70. Base member 70 is a support for housing 39 and other components and may be affixed to a wall or have legs for support.

The air supply 10 is also connected to heating element housing 75 through pressure regulator 76, shut off valve 77 and pressure gage 78 by means of piping 79. Heating element 80 may have either manual or automatic rheostat control for supplying a predetermined temperature. The housing 75 is connected to base member 70 by means of welding or other known methods.

An infrared scanner 85 provides a 180° scan of the outer circular cross sectional area of coalescer element 30. An electrical signal is provided from infrared scanner 85 to thermogram dispaly unit 86.

FIG. 2 shows a view of housing 39 having an upper plate 45 and lower plate 59 with respective openings 95 and 96. Strips 65 connect upper and lower plates 45 and 59 to each other. The strips 65 can be connected to upper plate 45 by means of screws for ease in assembling and disassembling the entire arrangement.

The operation of the device will now be explained with reference to the figure. The air supply 10 is pressure regulated by regulator 12 and supplied to air motor 11 so as to rotate the motor at such a speed as to supply a rotational speed of 10 – 15 rpm to coalescer 30 through the associated linkage connecting motor 11 to coalescer 30.

The air supply 10 is also connected to coalescer element 30 through piping 79, regulator 76 set to approximately 25 psi presure, valve 77, heating element 80 set to a temperature of 113°– 135° F, and elements 70, 59, 58 and 54. This supply of air permeates the coalescer element 30 from the inside through the outside surface. The infrared scanner 85 then provides a signal to thermogram display unit 86 that displays a thermogram 87 showing a flaw as the light portion in the center of thermogram 87.

Portions of the coalescer element in which there are no flaws provide a temperature drop of approximately 3° F while those with serious flaws such as holes may produce only a ½° F temperature drop at the place the flaw exists. This would mean that a temperature on the inside of a coalescer element of 125° F would be approximately 122° F at the outside of the element at portions without a flaw and at higher temperatures where a flaw is present. The thermography equipment is sensitive enough to provide a thermogram wherein temperature differences of 1/10° F can be distinguished.

There has therefore been described apparatus and means for non-destructive testing of filter elements. This is accomplished as previously described by taking into account the differences in temperature differentials across the filter element depending on whether a flaw exists in the element or not.

It will be understood that various changes in the details, materials, steps and arrangements of parts, which have been herein described and illustrated, in order to explain the nature of the invention, may be made by those skilled in the art within the principle and scope of the invention as expressed in the appended claims.

What is claimed is:

1. A filter testing arrangement comprising:
   a pressurized air supply for supplying pressurized air;
   a heating element connected for heating said pressurized air;
   a filter element connected for receiving said air supply on the inside surface of said filter element so as to provide a temperature drop across said filter element from the inside surface to the outside surface of said filter element on said pressurized air passing through;
   sensing means for scanning the outside surface of said filter element and providing output signals indicative of temperatures on said outside surface of said filter element; and
   display means connected to receive said sensing means output signals for displaying information indicative of said temperatures on said outside surface.

2. A filter testing arrangement according to claim 1 further comprising:
   rotation means for rotating said filter element.

3. A filter testing arrangement according to claim 2 wherein said display means further comprises a video screen for displaying thermograms.

4. A filter testing arrangement according to claim 3 wherein said sensing means comprises an infrared scanner.

5. A filter testing arrangement according to claim 4 wherein said filter element comprises a coalescer element used in filtering aircraft fuel.

6. A filter testing arrangement according to claim 5 wheerein said rotation means further comprises:
   an air motor connected to receive said pressurized air;
   an air pressure regulator connected to regulate the pressure of said pressurized air to said air motor;
   a tachometer-generator connected to said air motor;
   an indicating gage connected to said tachometer-generator for indicating the rotational speed of said air motor;
   a first slidable bearing connected intermediate said air motor and said coalescer element; and
   a second slidable bearing connected intermediate said heating element and said coalescer element.

7. A method of non-destructive testing of a coalescer element used in filtering aircraft fuel, comprising the steps of:
   passing heated pressurized air from the inside surface to the outside surface of the coalescer element;
   scanning the outside surface of said coalescer element with an infrared scanner; and
   displaying the outside surfce of said coalescer element in the form of a thermogram.

8. A method of non-destructive testing of a coalescer element according to claim 7 further comprising:
   rotating said coalescer element with reference to said infrared scanner.

9. A filter testing arrangement comprising:
   a pressurized gas supply for supplying pressurized gas;
   a heating element connected for heating said pressurized gas;
   a filter element connected for receiving said gas supply on the inside surface of said filter element so as to provide a temperature drop across said filter element from the inside surface to the outside surface of said filter element on said pressurized gas passing through;

sensing means for scanning the outside surface of said filter element and providng output signals indicative of temperatures on said outside surface of said filter element; and display means connected to receive said sensing means output signals for displaying information indicative of said temperatures on said outside surface.

* * * * *